United States Patent
Lin et al.

(10) Patent No.: US 11,205,234 B1
(45) Date of Patent: Dec. 21, 2021

(54) FARM-SENSING SYSTEM AND CALIBRATION METHOD OF SENSOR DATA THEREOF

(71) Applicant: Quanta Computer Inc., Taoyuan (TW)

(72) Inventors: Yi-Bing Lin, Taoyuan (TW); Yun-Wei Lin, Taoyuan (TW); Chia-Yuan Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/113,704

(22) Filed: Dec. 7, 2020

(30) Foreign Application Priority Data

Jun. 30, 2020 (TW) .................................. 109121973

(51) Int. Cl.
  *G08B 23/00* (2006.01)
  *G06Q 50/02* (2012.01)
  *H04W 4/38* (2018.01)
  *G01D 21/02* (2006.01)
  *H04L 29/08* (2006.01)

(52) U.S. Cl.
  CPC ............. *G06Q 50/02* (2013.01); *G01D 21/02* (2013.01); *H04L 67/12* (2013.01); *H04W 4/38* (2018.02)

(58) Field of Classification Search
  CPC ......... G06Q 50/02; G01D 21/02; H04W 4/38; H04L 67/12
  USPC ................. 340/521, 540, 541, 606, 584, 635
  See application file for complete search history.

(56) References Cited

U.S. PATENT DOCUMENTS

| | | | | |
|---|---|---|---|---|
| 7,834,774 | B2 * | 11/2010 | Stevens ................... | A01J 5/007 340/635 |
| 8,643,495 | B2 * | 2/2014 | Lan .......................... | A01G 9/24 340/602 |
| 2014/0343806 | A1 | 11/2014 | Kuhnel et al. | |

FOREIGN PATENT DOCUMENTS

CN          110672143 A      1/2020

OTHER PUBLICATIONS

Chinese language office action dated Jul. 14, 2021, issued in application No. TW 109121973.

* cited by examiner

*Primary Examiner* — Tai T Nguyen
(74) *Attorney, Agent, or Firm* — McClure, Qualey & Rodack, LLP (57) ABSTRACT

A farm sensing system is provided. The farm sensing system includes a cloud server, a sensing apparatus, and a computer device. The sensing apparatus is configured to be connected to a specific sensor disposed on a farm. The computer device is configured to obtain specific sensor data generated by the specific sensor through the cloud server. In response to there being potential failure of the specific sensor, the sensing apparatus enters a sensor-calibration mode. In response to a reference sensor being connected to the sensing apparatus, the sensing apparatus builds a calibration table by periodically receiving specific sensor data and reference sensor data, and executes a finite-state machine to perform a calibration procedure on each entry in the calibration table. In response to the number of consecutive hits of the one-to-one correspondence in a specific entry in the calibration table reaching a predetermined number N, the finite-state machine stops the calibration procedure and determines that the specific entry is calibratable.

10 Claims, 8 Drawing Sheets

FARM-SENSING SYSTEM AND CALIBRATION METHOD OF SENSOR DATA THEREOF

CROSS REFERENCE TO RELATED APPLICATIONS

This Application claims priority of Taiwan Patent Application No. 109121973, filed on Jun. 30, 2020, the entirety of which is incorporated by reference herein.

BACKGROUND OF THE INVENTION

Field of the Invention

The present invention relates in general to sensor apparatuses, and, in particular, to a farm-sensing system and a calibration method of sensor data thereof.

Description of the Related Art

For various applications of the Internet of Things (IoT), different types of sensors will be widely installed where needed. Because many smart applications of the Internet of Things often cause inaccurate sensor data due to failure, aging or interference of the installed sensor, sensor calibration is a very important issue, especially in applications for setting sensors outdoors, such as smart agriculture. Because the application of smart agriculture requires many different types of sensors to be installed on a farm (including in outdoor environments), if some of these sensors fails or ages, and the resulting sensor data is inaccurate, resulting in inappropriate local spraying of water, pesticides or fertilizers on the farm and thus causing agricultural damage.

Therefore, there is need for a farm-sensing system and a calibration method of sensor data thereof to solve the above problems.

BRIEF SUMMARY OF THE INVENTION

In an exemplary embodiment, a farm sensing system is provided. The farm sensing system includes a cloud server, a sensing apparatus, and a computer device. The sensing apparatus is connected to a specific sensor disposed in a farm, wherein the specific sensor is configured to detect environmental information about the farm to generate corresponding specific sensor data. The computer device is configured to obtain the specific sensor data generated by the specific sensor from the sensing apparatus through the cloud server. In response to the computer device determining that there is potential failure of the specific sensor according to the specific sensor data, the computer device transmits a calibration command to the sensing apparatus through the cloud server to control the sensing apparatus to enter a sensor-calibration mode. In response to a reference sensor of the same type as the specific sensor being connected to the sensing apparatus, the sensing apparatus establishing a calibration table by continuously and periodically receiving the specific sensor data and reference sensor data respectively from the specific sensor and the reference sensor, wherein each entry in the calibration table records one-to-one correspondence between the specific sensor data and the reference sensor data. The sensing apparatus executes a finite-state machine to perform a calibration procedure on each entry in the calibration table, wherein in response to the number of consecutive hits of the one-to-one correspondence between the specific sensor data and reference sensor data stored in a specific entry in the calibration table reaching a predetermined number N, the finite-state machine stops the calibration procedure of the specific entry and determines that the specific entry is calibratable.

In some embodiments, in response to a number of consecutive misses of the one-to-one correspondence between the specific sensor data and reference sensor data stored in the specific entry in the calibration table reaching the predetermined number N, the finite-state machine stops the calibration procedure of the specific entry and determines that the specific entry is not calibratable. In some embodiments, the predetermined number N is equal to 2.

In some embodiments, when the finite-state machine determines that the specific entry is not calibratable, the sensing apparatus determines that the specific sensor has failed and transmits a sensor-failure message to the computer device to notify, a farm administrator to replace the specific sensor.

In some embodiments, when the sensing apparatus determines that each entry in the calibration table is calibratable, the sensing apparatus calibrates the specific sensor data generated by the specific sensor using the calibration table, and transmits the calibrated specific sensor data to the computer device through the cloud server.

In another exemplary embodiment, a calibration method of sensor data, for use in a farm sensing system is provided. The farm sensing system includes: a cloud server, a sensing apparatus, and a computer device. The sensing apparatus is connected to a specific sensor disposed in a farm, and the specific sensor detects environmental information about the farm to generate corresponding specific sensor data. The method includes the following steps: obtaining, by the computer device, the specific sensor data generated by the specific sensor from the sensing apparatus through the cloud server; in response to determining that there is potential failure of the specific sensor according to the sensor data, transmitting, by the computer device, a calibration command to the sensing apparatus through the cloud server to control the sensing apparatus to enter a sensor-calibration mode; in response to a reference sensor of the same type as the specific sensor being connected to the sensing apparatus, building, by the sensing apparatus, a calibration table by periodically receiving the specific sensor data and reference sensor data respectively from the specific sensor and the reference sensor, wherein each entry in the calibration table records one-to-one correspondence between the specific sensor data and the reference sensor data executing, by the sensing apparatus, a finite-state machine to perform a calibration procedure on each entry in the calibration table; and in response to the number of consecutive hits of the one-to-one correspondence between the specific sensor data and reference sensor data stored in a specific entry in the calibration table reaching a predetermined number N, stopping, by the finite-state machine, the calibration procedure of the specific entry and determines that the specific entry is calibratable.

In some embodiments, the method further includes: in response to a number of consecutive misses of the one-to-one correspondence between the specific sensor data and reference sensor data stored in the specific entry in the calibration table reaching the predetermined number N, stopping, by the finite-state machine, the calibration procedure of the specific entry and determines that the specific entry is not calibratable. In some embodiments, the predetermined number N is 2.

In some embodiments, the method further includes: when the finite-state machine determines that the specific entry is not calibratable, determining, by the sensing apparatus, that the specific sensor fails and transmits and sensor-failure message to the computer device to notify a farm administrator to replace that specific sensor.

In some embodiments, the method further includes the following steps: when the sensing apparatus determines that each entry in the calibration table is calibratable, calibrating, by the sensing apparatus, the specific sensor data generated by the specific sensor using the calibration table, and transmits the calibrated specific sensor data to the computer device through the cloud server.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

It must be understood that the words "including", "including" and other words used in this specification are used to indicate the existence of specific technical features, values, method steps, operations, elements and/or components, but not It is not excluded that more technical features, values, method steps, job processing, elements, components, or any combination of the above can be added.

Words such as "first", "second", and "third" used in the claims are used to modify the elements in the claims, and are not used to indicate that there is an order of priority, antecedent relationship, or It is an element that precedes another element, or the chronological order of execution of method steps, which is only used to distinguish elements with the same name.

Figure 1:
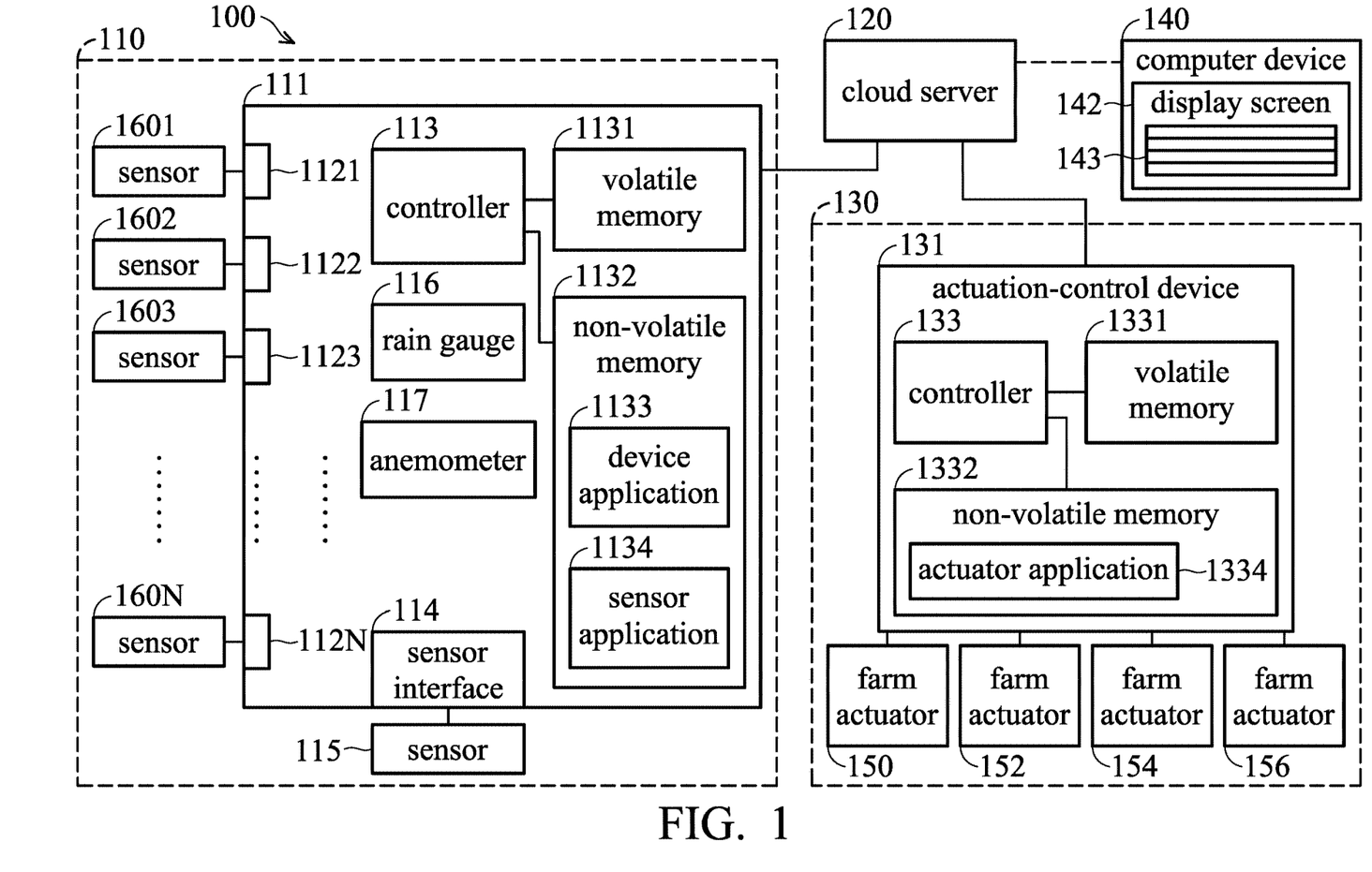
FIG. 1 is a diagram of a farming-sensing system in accordance with an embodiment of the invention.

FIG. 1 is a diagram of a farming-sensing system in accordance with an embodiment of the invention.

The farm-sensing system 100 may include a sensing section 110, a cloud server 120, an actuator 130, and a computer device 140, wherein the sensing section 110, actuator 130, and computer device 140 may be electrically connected to the cloud server 120. The sensing section 110 is configured to detect various environmental information about a farm to generate sensor data of different types.

In an embodiment, the sensing section s 110 may include a sensing apparatus 111, a plurality of sensors 1601 to 160N, and a sensor 115. In addition, the sensing apparatus 11 may include a controller 113, a volatile memory 1131, a non-volatile memory 1132, and a plurality of sensor interfaces 1121 to 112N and 114. Each sensor among the sensors 1601 to 160N, for example, may be connected to the sensing apparatus 11 via the corresponding sensor interface among the sensor interface 1121 to 112N, and the sensor 115 can be connected to the sensing apparatus 111 via the sensor interface 114. The controller 113 may be a central-processing unit (CPU), a general-purpose processor, or a microcontroller, but the invention is not limited thereto.

For example, the sensors 1601 to 160N can be disposed outside the sensing apparatus 111, and the sensors 1601 to 160N may be sensors for detecting different types of information about the farm. The sensors 1601 to 160N may include but is not limited to temperature sensors, ultraviolet (UV) sensors, humidity sensors, carbon dioxide ($CO_2$) sensors, atmosphere-pressure sensors, soil-humidity sensors, soil-temperature sensors, soil-conductivity sensors, soil-PH sensors, wherein the soil-humidity sensors, soil-temperature sensors, soil-conductivity sensors, soil-PH sensors can be collectively regarded as soil sensors. It should be noted that the number of sensors of each type is not limited to one, and the user may arrange different numbers of sensors for each type of sensor data according to the size of the farm and the actual situation. For example, the user may set humidity sensors and soil sensors in different corners of the farm to more accurately determine the environmental information about different locations on the farm. In addition, the sensing apparatus 111 further includes a rain gauge 116 and an anemometer 117, wherein the rain gauge and anemometer 117 can be disposed inside the housing (not shown) of the sensing apparatus 111 to detect the rainfall and wind speed of the farm.

Specifically, the sensing apparatus 111 may include a volatile memory 1131 and a non-volatile memory 1132. The volatile memory 1131, for example, may be a dynamic random access memory (DRAM) or a static random access memory (SRAM), but the invention is not limited thereto. The non-volatile memory 1132 may be a hard-disk drive (HDD), a solid-state disk (SSD), a flash memory, or a read-only memory (ROM), but the invention is not limited thereto. The non-volatile memory 1132 is configured to store a device application (DA) 1133 and a sensor application (SA) 1134.

The device application 1133 may support Hyper-text Transfer Protocol Secure (HTTPS) and Message Queuing Telemetry Transport (MQTT) standards for IoT communication, thereby communicating with the could server 120. The sensor application is configured to perform a calibration mechanism of the sensors, such as building a calibration table to calibrate the original sensor data. The controller 113 of the sensing apparatus 111 may load the device application 1133 and sensor application 1134 from the non-volatile memory 1132 to the volatile memory 1131 for execution.

The controller 113, for example, may receive corresponding original sensor data from the sensors 1601 to 160N, rain gauge 116, and anemometer 117. The sensor application 1134 executed by the controller 113 may perform a calibration of the original sensor data from each sensor, and the device application 1133 may transmit the calibrated sensor data to the cloud server 120 through wired or wireless transmission using the HTTPS and MQTT protocols.

The cloud server 120 is configured to receive various environmental information from the farm detected by the sensing section 110, and perform one or more artificial-intelligence (AI) models to determine whether to transmit an actuation command to the actuation-control device 131 to control the farm actuators 150 to 160 to perform corresponding actions on the farm. In addition, the cloud server 120 also serves as a communication bridge between the sensing apparatus 111, actuation-control device 131, and the computer device 140. That is, the computer device 140 transmits control commands or calibration commands to the actuation-control device 131 or the sensing apparatus 111 through the cloud server 120, and the sensor data obtained by the sensing apparatus 111 is also sent to the computer device 140 through the cloud server 120.

In an embodiment, the actuation section 130 may include an actuation-control device 131 and a plurality of farm actuators 150 to 156, wherein the farm actuators 150, 152, 154, and 156, for example, may be a water dripper (or sprinkler), pest sprayer, fertilizer sprayer, and insect-repellent lamp, respectively. In addition, the actuation-control device 131 may include a controller 133, a volatile memory 1331, and a non-volatile memory 1334. The controller 133 may be a central-processing unit (CPU), a general-purpose processor, or a microcontroller, but the invention is not limited thereto. The volatile memory 1331, for example, may be a dynamic random access memory (DRAM) or a static random access memory (SRAM), but the invention is not limited thereto. The non-volatile memory 1332 may be a hard-disk drive (HDD), a solid-state disk (SSD), a flash memory, or a read-only memory (ROM), but the invention is not limited thereto. The non-volatile memory 1332 is configured to store an actuator application 1334. The controller 133 of the actuation-control device 131 may load the actuator application 1334 from the non-volatile memory 1332 to the volatile memory 1331 for execution.

The farm actuators 150 to 156 are connected to the actuation-control device 131, and the controller 133 of the actuation-control device 131 may control the farm actuators 150 to 156 to perform corresponding actions on the farm according to the actuation commands from the cloud server 120, such as spraying water, insect repellent, fertilizer, or activating the insect-repellent light.

The computer device 140 may be a personal computer or an electronic portable device (e.g., a smartphone or a tablet PC). For convenience of description, in the following embodiments, the computer device 140 is described by taking a smartphone as an example. The computer device 140 can communicate with the cloud server 120 and transmit data using a wireless communication protocol, where the wireless communication protocol includes, for example, third generation (3G), fourth generation (4G), fifth generation (5G) Wi-Fi, long-term evolution (LTE), near-field communication (NFC), Bluetooth, low-power wide-area network (LPWAN), LoRaWAN, Sigfox, NB-IoT, etc., but the invention is not limited thereto.

As depicted in FIG. 1, the computer device 140 can execute a monitoring program (not shown) to display a web-based monitoring interface 143 on the display screen 142, and the monitoring program can transfer the sensor data that is received by the computer device 140 from the sensing section 110 through the cloud server 120 on the monitoring interface 143.

In an embodiment, the computer device 140 may perform homogeneous tests, heterogeneous tests, or a combination thereof on some types of the sensors 1601 to 160N according to the received sensor data to determine whether there is a potential failure of a sensor in the sensing section 110. The computer device 140 may display a warning message on the monitoring interface 143, and transmit a failure-notification message to the cloud server 120 upon determining that there is a potential failure of a sensor, so that the cloud server 120 transmits a calibration command to the sensing apparatus 111 to control the sensing apparatus 111 to enter a sensor-calibration mode from a normal mode.

For example, the homogenous tests performed by the computer device 140 refers to the data analysis of the sensor data generated by the sensors of the same type in the same farm, thereby determining whether there is a potential failure of any sensor of the same type. Taking atmosphere-pressure sensors, temperature sensors, humidity sensors, and $CO_2$ sensors as examples, in theory, the sensor data generated by multiple sensors of the same type disposed in the same farm are highly correlated from each other. If the error between the sensor data generated by a specific senor and the sensor data generated by other sensors of the same type is too large (e.g., greater than a standard deviation, not limited), the computer device 140 can determine that there is a potential failure of the specific sensor.

In addition, if the locations and altitudes of different farms are very different, the sensor data detected by the various types of sensors in the farms at different locations will theoretically be different. That is, in addition to comparing the sensor data of the sensors of the same type in the same farm, the computer device 140 can also compare the sensor data of the sensors of the same type in farms at different locations. Besides, if only one set of the sensing section 110 is disposed in the same farm, the computer device 140 can obtain weather information from the nearest government weather station, and compare the obtained weather information with the sensor data of the corresponding sensors in the sensing section 110 to determine whether there is a potential failure of any sensor.

The heterogeneous tests performed by the computer device 140 require the cooperation of the sensors 1601 to 160N and the farm actuators 150 to 156. For example, taking the soil-humidity sensor and the water dripper as an example, when the soil-humidity sensor and the water dripper are operating normally, the computer device 140 may calculate a delay time t between activation and deactivation of the water dripper. According to the histogram of the delay time t, the computer device 140 can derive a distribution for selecting a suitable delay time threshold T. When it is impossible to determine whether the soil-humidity sensor and the water dripper installed on the same farm are operating normally, the computer device 140 will continue to perform the interactive test of the soil-humidity sensor and the water dripper by measuring the delay time t. If the water dripper cannot be turned off within the delay time threshold T after being turned on, the computer device 140 will determine that a potential failure has occurred.

Specifically, when the sensor data of the soil-humidity sensor received by the cloud server 120 from the sensing apparatus 111 indicates that the RH value of the farm soil is too low (e.g., lower than 45% RH), the actuator application 1334 performed by the computer device 140 may sent a control signal to the actuation-control device 131 through the cloud server 120 to control the water dripper to start watering. If the water dripper works normally, after a predetermined of time, the humidity of the farm soil should increase to a predetermined threshold (e.g., 45% RH). When the soil-humidity sensor detects that the soil humidity of the farm reaches the predetermined threshold within the delay time threshold T, the computer device 140 may determine that there is a potential failure of the soil-humidity sensor or the water dripper after receiving the sensor data of the soil-humidity sensor through the cloud server 120. Meanwhile, the monitoring interface 143 of the computer device 140 may display a warning message to notify the farmer, and sends a warning message to the cloud server 120 to indicate that a potential failure has occurred.

Figure 2:
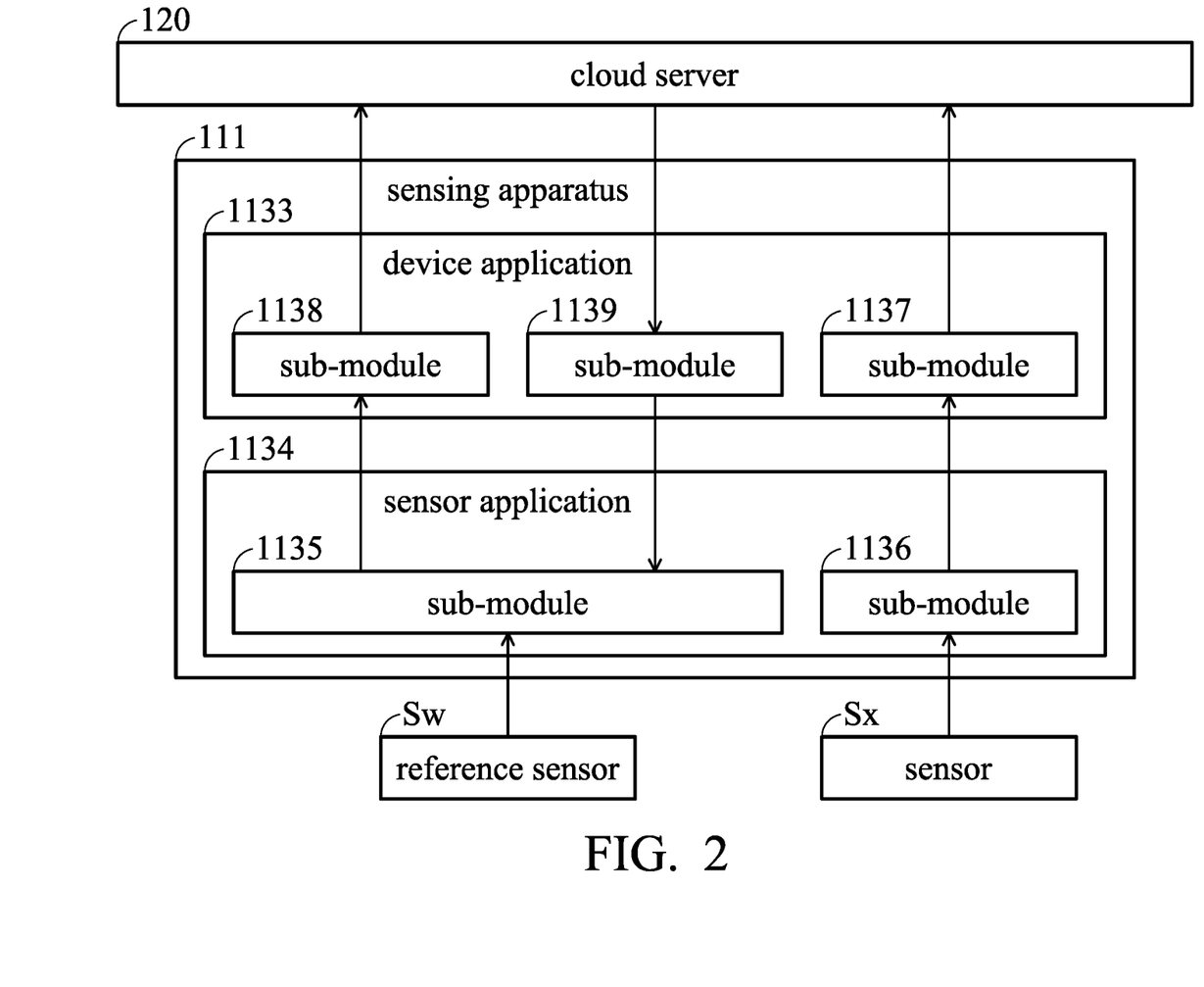
FIG. 2 is a diagram of communication between the sensor apparatus and cloud server in accordance with an embodiment of the invention.

FIG. 2 is a diagram of communication between the sensor apparatus and cloud server in accordance with an embodiment of the invention.

As depicted in FIG. 2, the device application 1133 and sensor application 1134 performed by the sensing apparatus 111 can be classified into sub-modules in the normal mode and the sensor-calibration mode. For example, the sensor application 134 may include sub-modules 1135 and 1136, and the device application 1133 may include sub-modules 1137, 1138, and 1139. The sub-modules 1137 and 138 may be input device features (IDFs), and can be respectively regarded as IDF X and IDF $C_b$ channels. The IDF channels are different communication channels between the sensing apparatus 111 and the cloud server 120. For example, the sensing apparatus 111 can transmit the sensor data of the sensor $S_x$ and $S_w$ to the cloud server 120 respectively through the IDF X and IDF $C_b$ channels. The sub-module 1139 may be output device feature that is used in the sensor-calibration mode. For example, the sub-module 1139 may receive the calibration request sent from the computer device 140 through the cloud server 140, and thus the sub-module 1139 can be regarded as the ODF $C_b$ module.

In the normal mode, the sub-module 1135 of the sensor application 1134 and the sub-module 1138 of the device application 1133 are not activated. When the sensing apparatus 111 is in the sensor-calibration mode, the controller 113 may activate the sub-module 1135 of the sensor application 1134 and the sub-modules 1138 and 1139 of the device application 1133. It should be noted that the sub-module 1136 of the sensor application 1134 and the sub-module 1137 of the device application 1133 are always active no matter whether the sensing apparatus 111 is in the normal mode or the sensor-calibration mode.

The sensor $S_x$ refers to one of the sensors 1601 to 160N connected to the sensing apparatus 111. In the normal mode, the sensors 1601 to 160N are connected to the sensing apparatus 111 and periodically detect the environmental information about the farm, but the sensor 115 is not connected to the sensing apparatus 111. The sensors of different types have different detection periods, and the user can adjust the detection period of each sensor or the period of the controller 111 capturing sensor data from each sensor according to actual conditions. The sensor data generated by the sensor $S_X$ will be sent to the sub-module 1136 (e.g., can be regarded as $SA_x$ module), and the sub-module 1136 will process the sensor data, and send the processed sensor data to the cloud server 120 through the sub-module 1137.

It should be noted that, taking the temperature sensor as an example, if the temperature range detected by the temperature sensor is −40 degrees Celsius to 65 degrees Celsius. The temperature sensor may not be able to accurately detect the temperature in some temperature ranges due to damage or aging caused by being in an outdoor environment, defects in the sensor's manufacturing process, or interference during the detection process. These problems can also be regarded as a potential failure of the temperature sensor. A similar method can be used to determine whether there is a potential failure of sensors of other types.

In the aforementioned embodiment, when the cloud server transmits a calibration command to the sensing apparatus 111, the sensing apparatus 111 enters the sensor-calibration mode from the normal mode. Meanwhile, the controller 113 will activate the sub-module 1135 of the sensor application 1134 and the sub-module 1138 of the device application 1133. Before starting the sensor-data-calibration procedure, the sensor 115 (i.e., sensor $S_w$) needs to be connected to the sensing apparatus 111 and placed next to the sensor $S_x$ that has a potential failure to ensure that the environmental information detected by the sensors $S_x$ and $S_w$ is similar. The sensor 115, for example, can be regarded as a standard sensor or a reference sensor. That is, the sensor 115 is a sensor that has been confirmed to work normally, so the accuracy of the sensor data generated by the sensor 115 is worthwhile trusted.

Given that $T_x$ is the data value measured by the sensor $S_x$ of entry X in the calibration table and the variable V, is used to store the most recently received data from the sensor Sx, the sub-module 1136 of the sensor application 1134 may execute the following pseudo code:
S1: Wait to receive a sample $v_x$ from $S_x$
S2: $V_x \leftarrow v_x$
S3: if $(T_x(v_x)=NIL)$, then $T_x(v_x) \leftarrow v_x$
S4: Send $T_x(v_x)$ to the IDF of $S_x$ in the DA
S5: Go to step S1

When starting to create the content in the entries of the calibration table, different values detected by the sensor $S_x$ will be sequentially filled into the entries in the calibration table. For example, the first data is filled into entry 1, and the second data is filled into entry 2, and so on. In brief, the content of the calibration table is initially empty, and different values detected by the sensor $S_x$ will be filled into each entry in the calibration table. It should be noted that step S1 to S5 will be executed continuously no matter whether or not the sensing apparatus 111 is in the sensor-calibration mode. That is, if the farm's environment changes greatly, the number of entries in the calibration table may increase.

In this embodiment, when the sensing device 111 is in the sensor calibration mode, the sub-module 1135 of the sensor application 1134 may perform a calibration procedure, for example, to fill the standard (STD) field corresponding to each entry in the calibration table with the value detected by the sensor $S_w$. For example, the sensing apparatus 111 may use the same time period to simultaneously capture sensor data from the sensors $S_w$ and $S_x$, where the sensor $S_x$ can be regarded as a device under test (DUT), and the sensor $S_w$ can be regarded as a standard sensor. Taking the temperature sensor as an example, if the DUT field of the first entry in the calibration table is 26.52 degrees Celsius and the temperature measured by the standard sensor $S_w$ is 24.98 degrees Celsius, the value of 24.98 degrees Celsius will be filled into the STD field of the first entry. Similarly, if the DUT field of the second of the calibration table is 27.41 degrees Celsius and the temperature measured by the standard sensor $S_w$ is 25.79 degrees Celsius, the value of 24.98 degrees Celsius will be filled into the STD field of the second entry. By repeating the aforementioned steps, values in the STD field of each entry in the calibration table can be established, as shown in Table 1:

TABLE 1

| entry | DUT (° C.) | STD (° C.) |
| --- | --- | --- |
| 1 | 26.52 | 24.98 |
| 2 | 27.41 | 25.79 |
| 3 | 28.90 | 27.19 |
| 4 | 31.45 | 29.68 |
| 5 | 32.73 | 29.85 |
| 6 | 33.00 | 31.22 |
| 7 | 32.73 | 31.61 |

TABLE 1-continued

| entry | DUT (° C.) | STD (° C.) |
|---|---|---|
| 8 | 33.79 | 32.35 |
| 9 | 34.67 | 33.82 |
| 10 | 35.33 | 33.86 |
| 11 | 35.90 | 34.48 |
| 12 | 35.88 | 34.51 |

In another embodiment, taking the humidity sensor as an example, if the DUT field of the first entry in the calibration table is 78.47% RH and the humidity measured by the standard sensor Sw is 77.24% RH, the value of 77.24% will be filled into the STD field of the first entry. Similarly, if the DUT field of the second of the calibration table is 77.31% and the humidity measured by the standard sensor Sw is 76.56%, the value of 76.56% will be filled into the STD field of the second entry. By repeating the aforementioned steps, values in the STD field of each entry in the calibration table can be established, as shown in Table 2:

TABLE 2

| entry | DUT (%) | STD (%) |
|---|---|---|
| 1 | 78.47 | 77.24 |
| 2 | 77.31 | 76.56 |
| 3 | 72.41 | 72.29 |
| 4 | 63.63 | 64.31 |
| 5 | 57.47 | 58.80 |
| 6 | 58.28 | 58.67 |
| 7 | 50.80 | 52.58 |
| 8 | 51.06 | 52.16 |
| 9 | 46.56 | 45.85 |
| 10 | 45.86 | 47.69 |
| 11 | 45.07 | 46.92 |
| 12 | 43.71 | 46.09 |

Figure 3A:
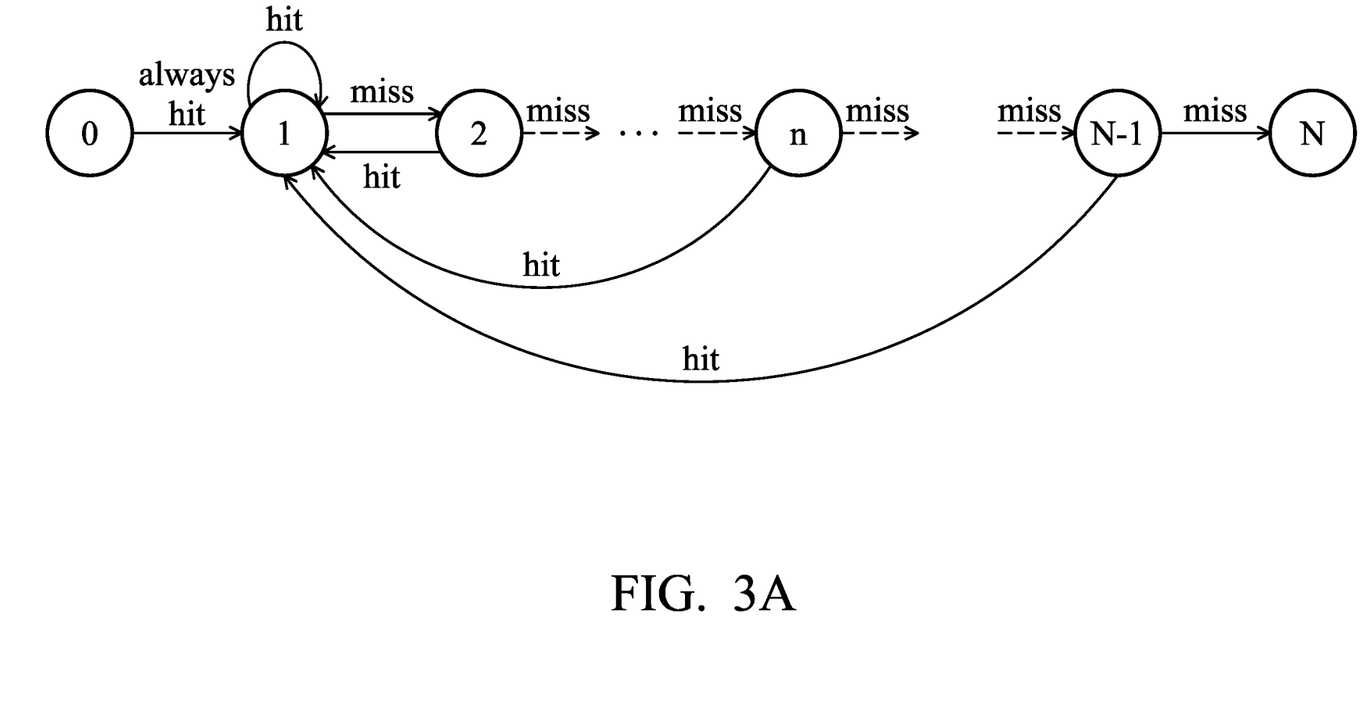
FIGS. 3A-3C are diagrams of different finite-state machines in accordance with an embodiment of the invention.

During the calibration procedure, the sensor $S_x$ (i.e., DUT) may detect the same value that has been previously detected, so if the sensor $S_x$ detects the same value, it will point to the same entry in the calibration table. Assuming that the entry $T_x(v_x)$ has previously been filled in with the corresponding standard value $v_W$, if the sensor $S_x$ detects the value $v_x$ and the sensor $S_w$ detects the value $v_W$, it means that the correspondence of the entry $T_x(v_x)$ hits. If the sensor $S_x$ detects the value $v_x$ and the sensor $S_w$ detects a value other than $v_W$, it indicates that the correspondence of the entry $T_x(v_x)$ misses. The aforementioned calibration procedure is controlled by a finite-state machine (FSM), and the status of "hit" or "miss" of the correspondence is the input signal of the finite-state machine, and can control the state transition of the finite-state machine, as shown in FIG. 3A. It should be noted that each sensor has a corresponding finite-state machine to calibrate the sensor data thereof. In some embodiments, the finite-state machine may be implemented by software codes. In some other embodiments, the finite-state machine may be implemented by a dedicated logic circuit.

In the embodiment, if the calibration message M=(s, id) is exchanged between the sensing apparatus 111 and the cloud server 120 through the control channel and the calibration message is sent from the cloud server 120 to the sensing apparatus 111, it indicates the status M.s=R which is a calibration request. When the calibration request is sent from the sensing apparatus 111 to the cloud server 120, the status M.s=C indicates that the calibration procedure is successfully completed, and the status M.s=F indicates that the calibration procedure has failed. M.id represents the number of the sensor to be calibrated. The corresponding state of each entry $T_x(v)$ in the calibration table $T_x$ is denoted as $F_x(v)$. Accordingly, the calibration procedure executed by the sub-module 1135 of the sensor application 1134 can be expressed by the following pseudo code;

W1: Wait to receive the calibration request message M=(R, id) from Channel ODF $C_b$
W2: X←M.id
W3: for (∀v∈$T_x$) do {$F_x(v)$←0}
W4: Wait to receive a value $v_w$ from $S_w$
W5: if $T_x(V_x)$=$v_w$ then $F_x(V_x)$←1
  else {$T_x(V_x)$←$v_W$; $F_x(V_x)$←−$F_x(V_x)$+1}
W6: if ($F_x(v)$=N) then {
W6a: Send the calibration failed message M=(F, X) to Channel IDF $C_b$;
  Go to Step W1;}
W6b: else if (∀v∈$T_x$, $F_x(v)$=1) then {
  send the calibration complete message M=(C, X) to Channel IDF $C_b$;
  Go to Step W1;}
W6c: else Go to Step W4;

It should be noted that the steps S1 to S5 and step W1 to S6 are executed independently. The value $V_x$ generated in step S2 and the execution time of step W4 are approximately the same. In an embodiment, even if the sensor $S_x$ can be calibrated, since the sensor $S_x$ may have a low probability of random errors, a miss may still occur during the calibration procedure. If the probability of miss is not 0, theoretically the finite-state machine in FIG. 3A will eventually proceed to the state of $F_x(v)$=N, and step W6a may determine that the calibration procedure has failed. In this case, the computer device (or the cloud server 120) will notify the farmer that it is necessary to replace the hardware of the sensor that has been misjudged to be invalid, but the sensor $S_x$ has not failed in fact, so it may cause unnecessary increase of costs.

In general, if the sensor $S_x$ can be calibrated, step W6b will be executed to successfully complete the calibration procedure. For the finite-state machine FSM0 in FIG. 3A, the only stable state is $F_x(v)$=N. In order to ensure that the state $F_x(v)$=1 is also a stable state, the finite-state machine FSM0 in FIG. 3A is changed to the finite-state machine FSM1 in FIG. 3B. Thus, after the calibration procedure is successfully completed, the flow is aborted in step W6b. The probability of successfully completing the calibration procedure and aborting is derived as follows.

Figure 3B:
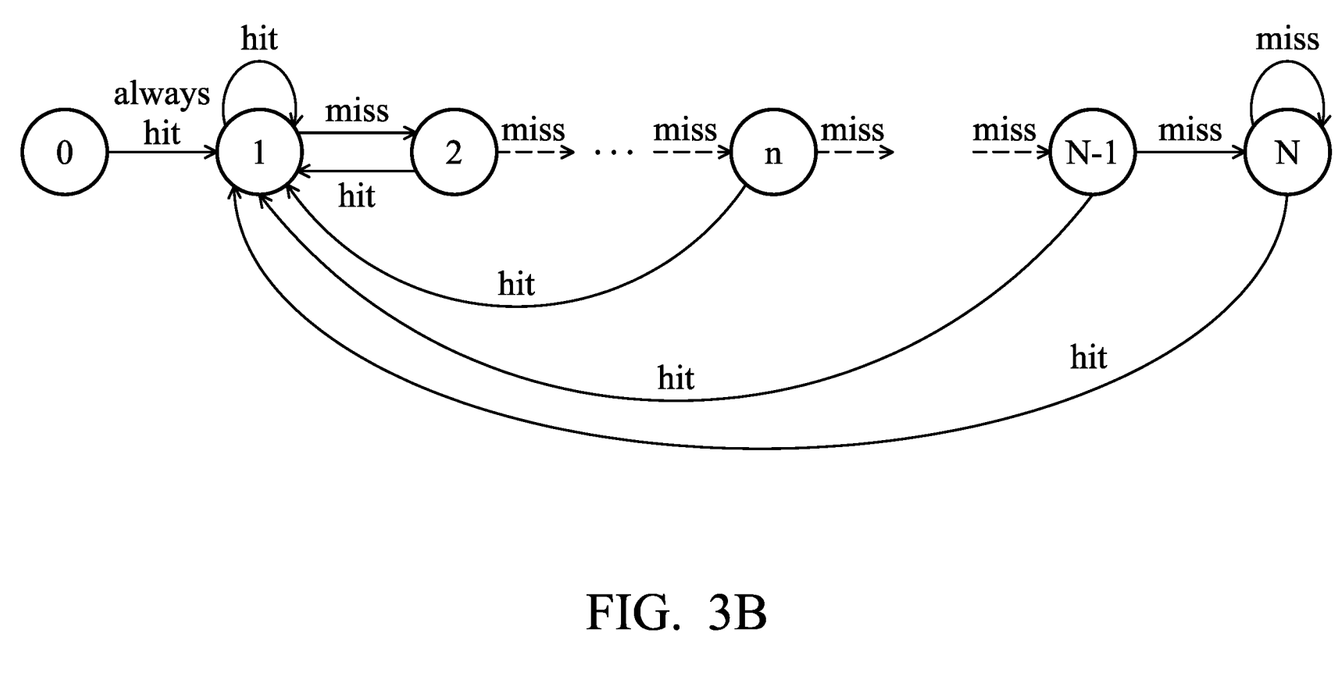

Let the probability $\pi_i$ of occurrence of the i-th state of the finite-state machine FSM1 is Pr[$F_x(v)$=i], since state 0 is a transient state, the probability of occurrence $\pi_0$=0. Accordingly, the total probability of occurrence of other states 1 to N is 1, which can be expressed by the equation (1):

$$\pi_1 + \pi_2 + \ldots + \pi_N = 1 \tag{1}$$

Let the probability of data hit Pr(hit)=p and the probability of data miss Pr(miss)=1−p, then equation (2) can be obtained:

$$\pi_1 = p\pi_1 + p\pi_2 + \ldots + p\pi_N = p \tag{2}$$

For 1<n<N, equations (3) and (4) can be obtained:

$$\pi_n = (1-p)\pi_{n-1} = p(1-p)^{n-1} \tag{3}$$

$$\pi_N = (1-p)\pi_{N-1} + (1-p)\pi_N = (1-p)^{N-1} \tag{4}$$

Accordingly, if the sensor $S_z$ can be calibrated, the sensor $S_x$ has a probability p that can be successfully calibrated no matter whether the value N is selected. If the sensor $S_x$ needs to be replaced, according to equation (4), the probability of replacing the sensor $S_x$ is $(1-p)^{N-1}$. In other words, if a larger value of N is selected, it will take a long time to perform the aforementioned calibration procedure before determining that the sensor $S_x$ needs to be replaced. In a preferred embodiment, N=2 is selected to perform the aforementioned calibration procedure.

For example, for each value of v, when the finite-state machine FSM1 in FIG. 3B proceeds to state $F_x(v)=1$ or N, the calibration of this value of v may be suspended. Accordingly, the finite-state machine FSM1 may randomly stop when entering state 1 or N. With regard to the aforementioned random model, the probability that the calibration procedure stops at step W6b is expressed by equation (5):

$$Pr[M.s=C]=P^{|T_x|} \quad (5)$$

For N=1, the probability that the calibration procedure stops at step W6a is expressed by equation (6):

$$Pr[M.s=F]=1-P^{|T_x|} \quad (6)$$

Figure 3C:
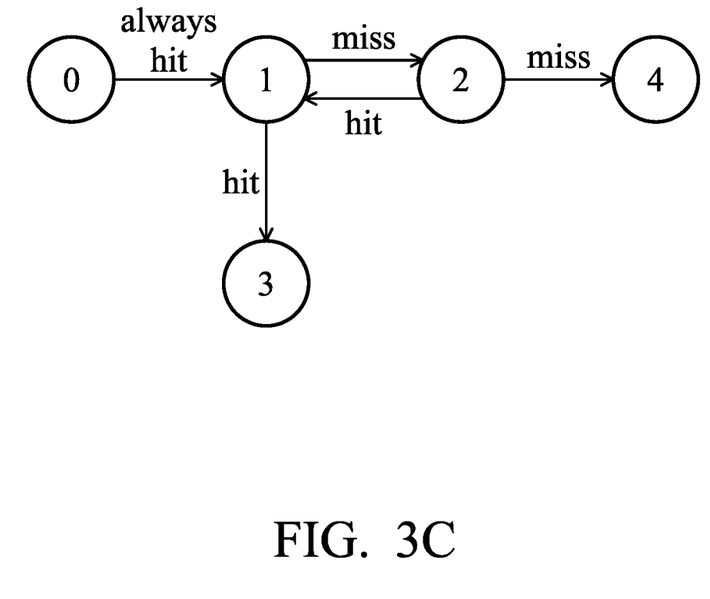

When the value of |Tx| is very large, the probability of reaching step W6b (i.e., successfully completing the calibration procedure) is very low. Thus, it is necessary to increase the probability of successfully completing the calibration procedure in equation (5). Specifically, as shown in the finite-state machine FSM2 in FIG. 3C, if there are two consecutive hits for a specific entry in the calibration table, the specific entry can be regarded as calibrated (or can be calibrated), and the finite-state machine FSM2 for this project entry will stop. Accordingly, the probability $\pi_{3,n}$ indicating that the probability that the finite-state machine FSM2 has visited state 1 for n times before proceeding to state 3 can be expressed by equation (7):

$$\pi_{3,n}=p[p(1-p)]^{n-1} \quad (7)$$

Thus, the probability that the finite-state machine FSM2 stops at state 3 can be expressed by equation (8):

$$\pi_{3,n} = \sum_{n=1}^{\infty} \pi_{3,n} = \frac{p}{1-p(1-p)} \quad (8)$$

Similarly, the probability $\pi_{4,n}$ indicating that the probability that the finite-state machine FSM2 has visited state 1 for n times before proceeding to state 4 can be expressed by equation (9):

$$\pi_{4,n}=(1-p)^2[p(1-p)]^{n-1} \quad (9)$$

Thus, the probability that the finite-state machine FSM2 stops at state 4 can be expressed by equation (10):

$$\pi_{4,n} = \sum_{n=1}^{\infty} \pi_{4,n} = \frac{(1-p)^2}{1-p(1-p)} \quad (10)$$

where equations (8) and (10) satisfy $\pi_{3,n}+\pi_{4,n}=1$.

Therefore, for the finite-state machine FSM2, the probability of calibration completion and calibration failure can be respectively expressed by equations (11) and (12):

$$Pr[M.s=C] = \left[\frac{p}{1-p(1-p)}\right]^{|T_x|} \quad (11)$$

$$Pr[M.s=F] = 1 - Pr[M.s=C] \quad (12)$$

For example, referring to the finite-state machine FSM2 in FIG. 3C, if the correspondence between the DUT and STD sensor data in a specific entry is missed after the first hit, the finite-state machine FSM2 will enter state 2. If the second hit occurs in state 2, the finite-state machine FSM2 will enter state 1. When a third hit occurs in state 1, the finite-state machine FSM2 will enter state 3 to determine that the specific entry is calibratable. If a miss occurs again in state 2, the finite-state machine FSM2 will enter state 4 to determine that the specific entry is not calibratable and the sensor $S_x$ (i.e., DUT) has failed. Briefly, if there are two consecutive misses for a specific entry in the calibration table $T_x$, the specific entry can be regarded as not calibratable.

Figure 4A:
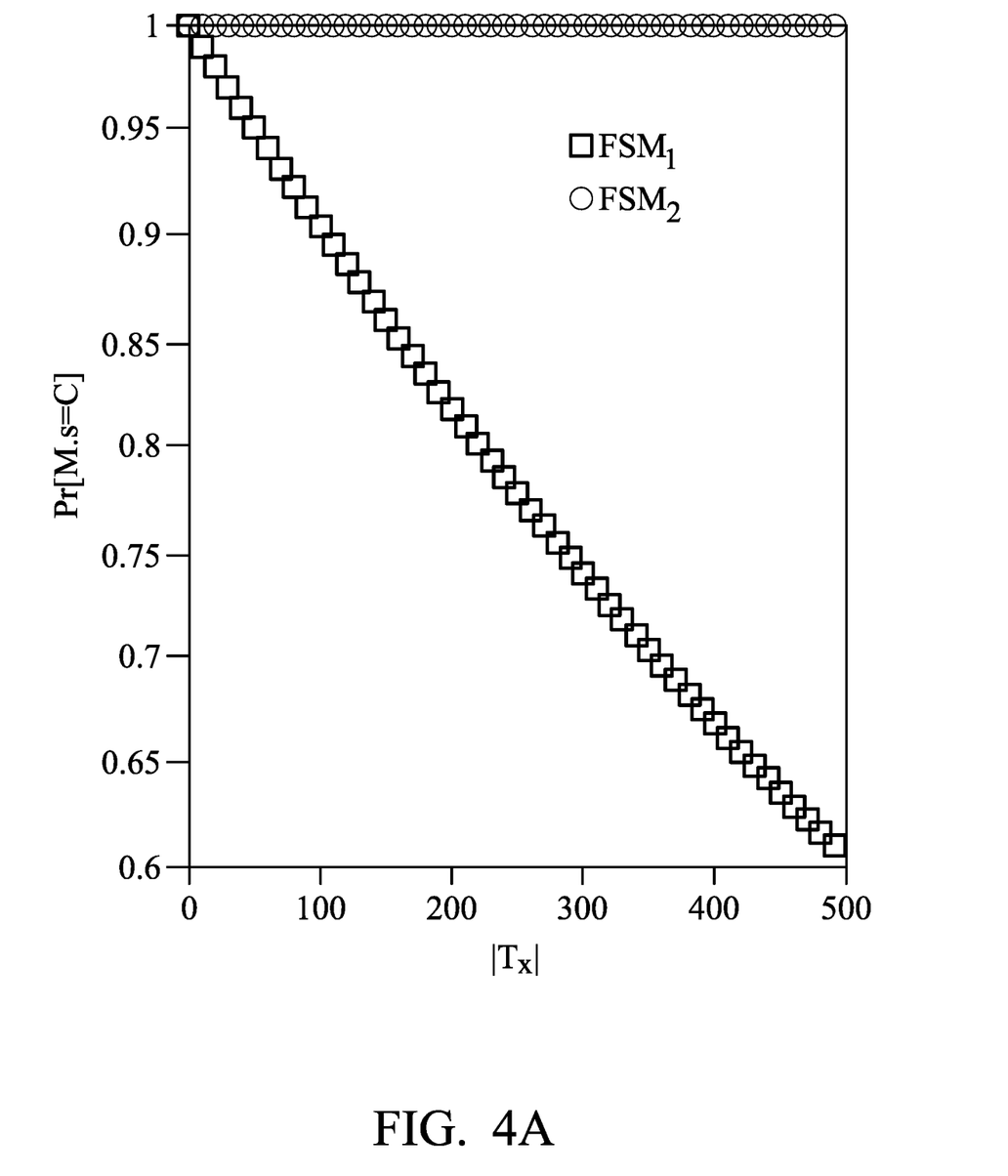
FIG. 4A is a diagram of relationships between the probability of successful calibration and a number of entries in the calibration table for FSM1 and FSM2 in accordance with an embodiment of the invention.
Figure 4B:
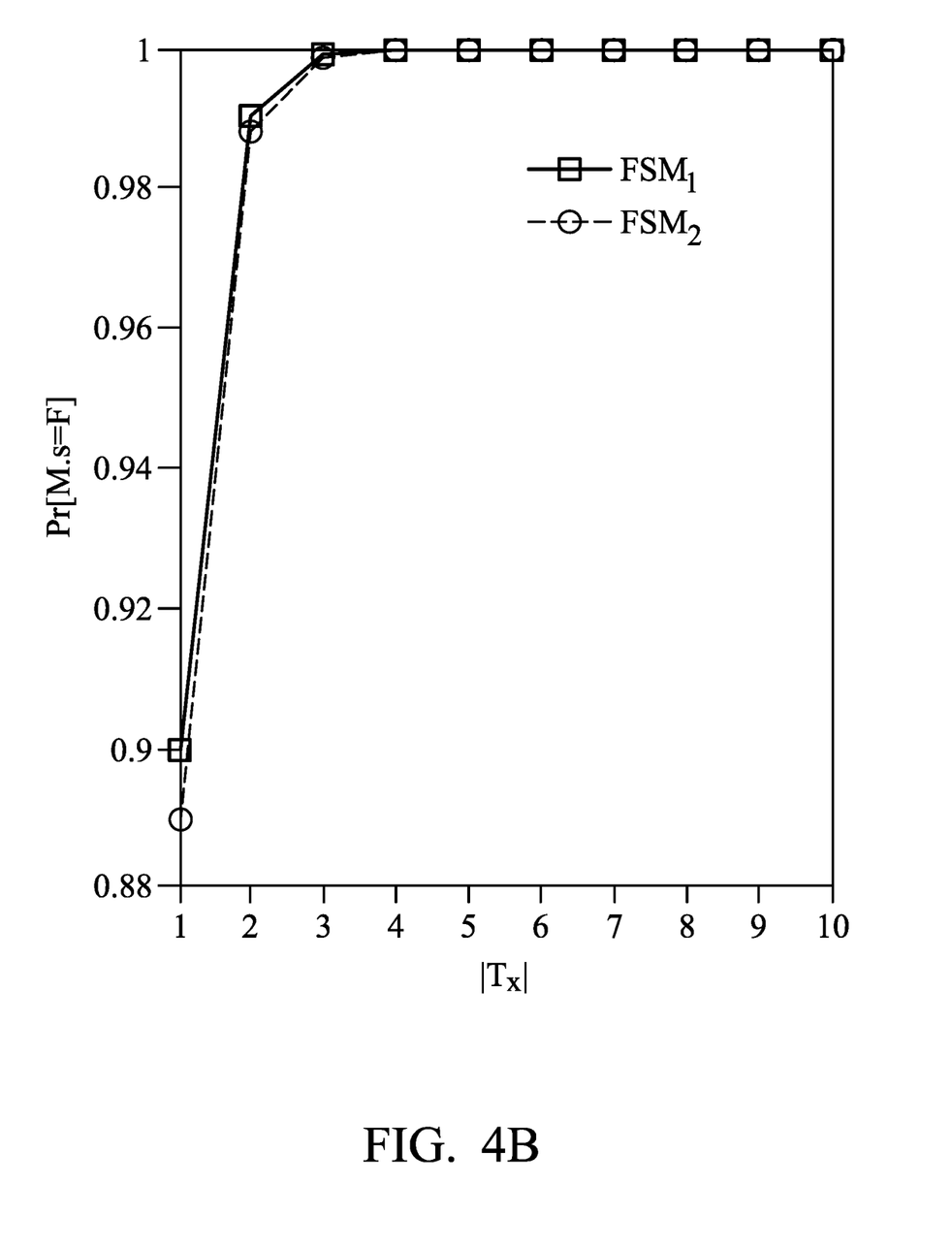
FIG. 4B is a diagram of relationships between the probability of calibration failure and a number of entries in the calibration table for FSM1 and FSM2 in accordance with an embodiment of the invention.

FIG. 4A is a diagram of relationships between the probability of successful calibration and the number of entries in the calibration table for FSM1 and FSM2 in accordance with an embodiment of the invention. FIG. 4B is a diagram of relationships between the probability of calibration failure and the number of entries in the calibration table for FSM1 and FSM2 in accordance with an embodiment of the invention.

Referring to FIG. 2 and FIGS. 4A to 4B, in an embodiment, if the probability p that the sensor data of the sensor $S_x$ can successfully hit is 0.999, the probability of successful calibration of the finite-state machine FSM1 will gradually decrease with the increment of the number of entries in the calibration table $T_x$. However, the probability of successful calibration of the finite-state machine FSM2 can be maintained at close to 1, as shown in FIG. 4A. If the sensor $S_x$ has truly failed and needs to be replaced (e.g., probability p of a successful hit is 0.1), FIG. 4B shows the relationship between the probability of calibration failure and the number of entries in the calibration table for the finite-state machines FSM1 and FSM2. As depicted in FIG. 4B, if the number of entries in the calibration table $T_x$ is greater than or equal to 5, the probability Pr[M.s=F] of determining failure of the sensor $S_x$ is close to 1.

It can be understood that if the sensor $S_x$ is calibratable, the finite-state machine FSM2 in FIG. 3C can still successfully establish the calibration table. In addition, in comparison with the finite-state machine FSM1 in FIG. 3B, if the sensor $S_x$ has truly failed and needs to be replaced, the calibration procedure of the finite-state machine FSM2 in FIG. 3C can be quickly stopped. It indicates that the finite-state machine FSM2 can quickly determine that the sensor $S_x$ has failed. Specifically, when the sensing apparatus III determines that each entry in the calibration table is calibratable, the sensing apparatus 111 will use the calibratable entry in the calibration table to calibrate the sensor data generated by the sensor $S_x$ and transmit the calibrated sensor data to the computer device 140 through the cloud server 120 without considering whether or not the sensing apparatus 111 is in the sensor-calibration mode. After the calibration of the sensor $S_x$ is completed, the sensor $S_w$ can be removed from the sensing apparatus by the farmer. However, if any entry in the calibration table is determined as not calibratable by the finite-state machine FSM2 (or FSM1), the sensing apparatus 111 determines that the sensor $S_x$ has failed, and transmits a sensor-failure message to the computer device 140 to notify the manager of the farm (e.g., the farmer).

Figure 5:
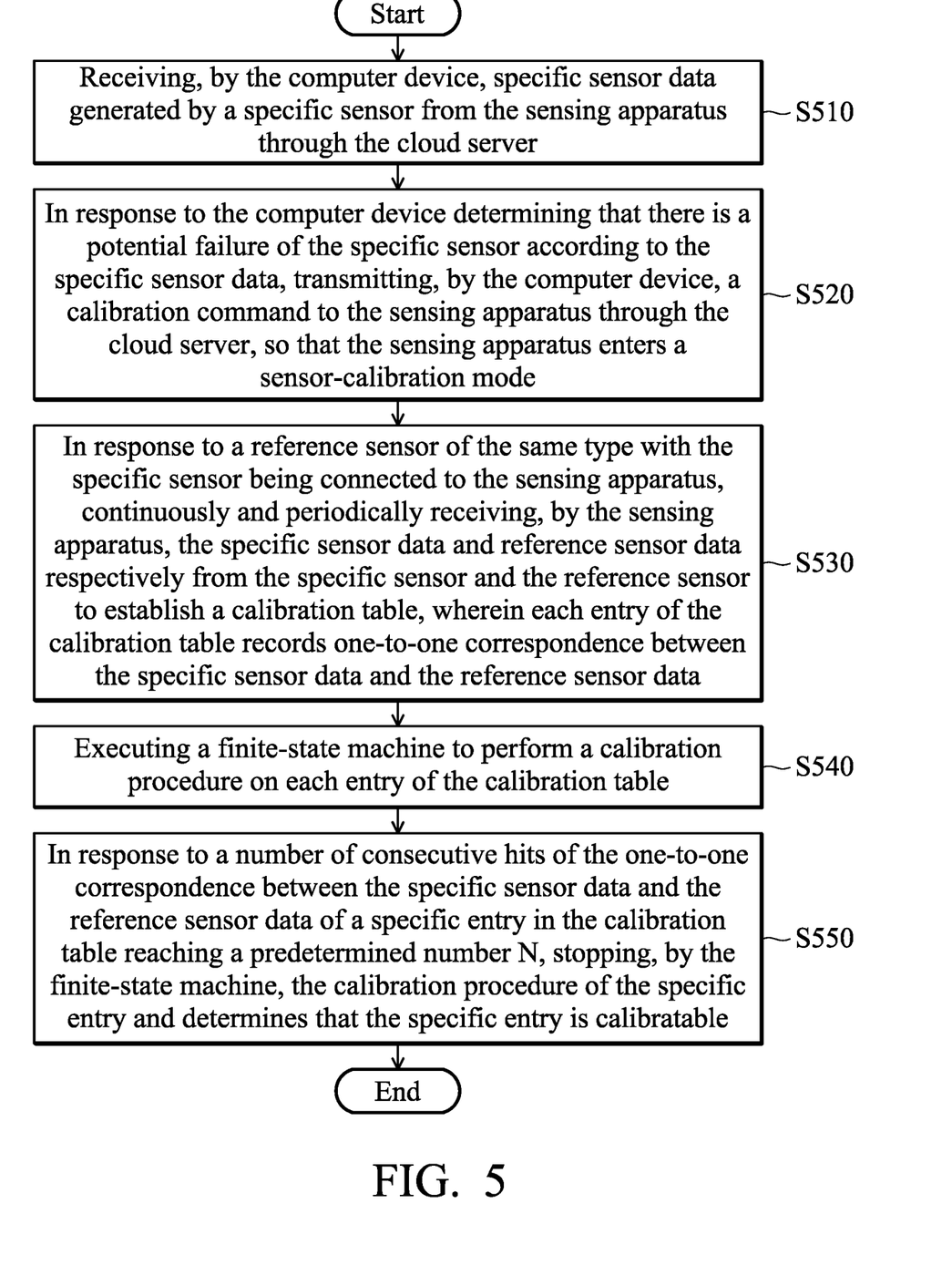
FIG. 5 is a flow chart of a calibration method of sensor data in accordance with an embodiment of the invention.

FIG. 5 is a flow chart of a calibration method of sensor data in accordance with an embodiment of the invention.

Referring to FIG. 1 and FIG. 5, in step S510, the computer device 140 receives specific sensor data generated by a specific sensor (e.g., sensor 1601) from the sensing apparatus 111 through the cloud server 120. The specific sensor may be one of a temperature sensor, ultraviolet (UV) sensor, humidity sensor, carbon dioxide (CO2) sensor, atmosphere-pressure sensor, soil-humidity sensor, soil-temperature sensor, soil-conductivity sensor, and soil-PH sensors, but the invention is not limited thereto.

In step S520, in response to the computer device 140 determining that there is a potential failure of the specific sensor according to the specific sensor data, the computer device 140 transmits a calibration command to the sensing apparatus 111 through the cloud server, so that the sensing apparatus 111 enters a sensor-calibration mode. For example, the computer device 140 may perform homogeneous tests, heterogeneous tests, or a combination thereof according to the received specific sensor data to determine whether there is a potential failure of a sensor in the sensing section 110, and the details can be referred to in the aforementioned embodiments.

In step S530, in response to a reference sensor of the same type with the specific sensor being connected to the sensing apparatus 111, the sensing apparatus 111 continuously and periodically receives the specific sensor data and reference sensor data respectively from the specific sensor and the reference sensor to establish a calibration table, wherein each entry in the calibration table records one-to-one correspondence between the specific sensor data and the reference sensor data.

In step S540, a finite-state machine is executed to perform a calibration procedure on each entry in the calibration table. For example, the finite-state machine may be the finite-state machine FSM1 in FIG. 3B or the finite-state machine FSM2 in FIG. 3C.

In step S550, in response to a number of consecutive hits of the correspondence between the specific sensor data and the reference sensor data of a specific entry in the calibration table reaching a predetermined number N, the finite-state machine stops the calibration procedure of the specific entry and determines that the specific entry is calibratable. According to the aforementioned embodiments, the predetermined number N is an integer greater than or equal to 2. In a preferred embodiment, the predetermined number N is equal to 2, but the invention is not limited thereto. One having ordinary skill in the art can adjust the value of the predetermined number N according to actual conditions.

For example, as shown in FIG. 3C, the finite-state machine FSM2 may include state 0, state 1, state 2, state 3, and state 4. It will always hit in state 0, and the finite-state machine FSM2 must enter state 1. The state transition between states 1 to 4 depends on the input (e.g., hit or miss) of the finite-state machine FSM2. If the correspondence between the reference sensor data and specific sensor data in the specific entry is missed after the first hit, the finite-state machine FSM2 will enter state 2. If the second hit occurs in state 2, the finite-state machine FSM2 will enter state 1. When a third hit occurs in state 1, the finite-state machine FSM2 will enter state 3 to determine that the specific entry is calibratable. If a miss occurs again in state 2, the finite-state machine FSM2 will enter state 4 to determine that the specific entry is not calibratable and the sensor $S_a$ (i.e., DUT) has failed.

In view of the above, a farm-sensing system and a calibration method of sensor data thereof are provided. The farm-sensing system and the calibration method are capable of performing the calibration procedure on the sensor data of a specific sensor having a potential failure using the reference sensor while determining that there is a potential failure of the specific sensor. In addition, the finite-state machine in the calibration procedure can quickly and accurately determine whether the specific sensor is calibratable or has failed, so time cost can be saved and unnecessary replacement of sensor hardware can be avoided.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A farm sensing system, comprising:
a cloud server;
a sensing apparatus, connected to a specific sensor disposed in a farm, wherein the specific sensor is configured to detect environmental information about the farm to generate specific sensor data; and
a computer device, configured to obtain the specific sensor data generated by the specific sensor from the sensing apparatus through the cloud server,
wherein in response to the computer device determining that there is a potential failure of the specific sensor according to the obtained specific sensor data, the computer device transmits a calibration command to the sensing apparatus through the cloud server to control the sensing apparatus to enter a sensor-calibration mode,
wherein in response to a reference sensor of the same type as the specific sensor being connected to the sensing apparatus, the sensing apparatus establishes a calibration table by continuously and periodically receiving the specific sensor data and reference sensor data respectively from the specific sensor and the reference sensor, wherein each entry in the calibration table records one-to-one correspondence between the specific sensor data and the reference sensor data,
wherein the sensing apparatus executes a finite-state machine to perform a calibration procedure on each entry in the calibration table,
wherein in response to a number of consecutive hits of the one-to-one correspondence between the specific sensor data and reference sensor data stored in a specific entry in the calibration table reaching a predetermined number N, the finite-state machine stops the calibration procedure of the specific entry and determines that the specific entry is calibratable.

2. The farm sensing system as claimed in claim 1, wherein in response to a number of consecutive misses of the one-to-one correspondence between the specific sensor data and the reference sensor data stored in the specific entry in the calibration table reaching the predetermined number N, the finite-state machine stops the calibration procedure of the specific entry and determines that the specific entry is not calibratable.

3. The farm sensing system as claimed in claim 2, wherein the predetermined number N is 2.

4. The farm sensing system as claimed in claim 2, wherein when the finite-state machine determines that the specific entry is not calibratable, the sensing apparatus determines that the specific sensor has failed, and transmits a sensor-failure message to the computer device to notify a manager of the farm to replace the specific sensor.

5. The farm sensing system as claimed in claim 2, wherein when the sensing apparatus determines that each entry in the calibration table is calibratable, the sensing apparatus calibrates the specific sensor data generated by the specific sensor using the calibration table, and transmits the calibrated specific sensor data to the computer device through the cloud server.

6. A calibration method of sensor data, for use in a farm sensing system, wherein the farm sensing system comprises: a cloud server, a sensing apparatus, and a computer device, and the sensing apparatus is connected to a specific sensor disposed in a farm, and the specific sensor detects environmental information about the farm to generate corresponding specific sensor data, the method comprising:

- obtaining, by the computer device, the specific sensor data generated by the specific sensor from the sensing apparatus through the cloud server;
- in response to determining that there is a potential failure of the specific sensor according to the specific sensor data, transmitting, by the computer device, a calibration command to the sensing apparatus through the cloud server to control the sensing apparatus to enter a sensor-calibration mode;
- in response to a reference sensor of the same type as the specific sensor being connected to the sensing apparatus, establishing, by the sensing apparatus, a calibration table by periodically receiving the specific sensor data and reference sensor data respectively from the specific sensor and the reference sensor, wherein each entry in the calibration table records one-to-one correspondence between the specific sensor data and the reference sensor data;
- executing, by the sensing apparatus, a finite-state machine to perform a calibration procedure on each entry in the calibration table; and
- in response to a number of consecutive hits of the one-to-one correspondence between the specific sensor data and reference sensor data stored in a specific entry in the calibration table reaching a predetermined number N, stopping, by the finite-state machine, the calibration procedure of the specific entry and determines that the specific entry is calibratable.

7. The calibration method as claimed in claim 6, further comprising:

- in response to a number of consecutive misses of the one-to-one correspondence between the specific sensor data and the reference sensor data stored in the specific entry in the calibration table reaching the predetermined number N, stopping, by the finite-state machine, the calibration procedure of the specific entry and determining that the specific entry is not calibratable.

8. The calibration method as claimed in claim 7, wherein the predetermined number N is 2.

9. The calibration method as claimed in claim 7, further comprising:

- when the finite-state machine determines that the specific entry is not calibratable, determining, by the sensing apparatus, that the specific sensor has failed and transmitting a sensor-failure message to the computer device to notify a manager of the farm to replace the specific sensor.

10. The calibration method as claimed in claim 7, further comprising:

- when the sensing apparatus determines that each entry in the calibration table is calibratable, calibrating, by the sensing apparatus, the specific sensor data generated by the specific sensor using the calibration table, and transmitting the calibrated specific sensor data to the computer device through the cloud server.

\* \* \* \* \*